(12) United States Patent
Szybisty et al.

(10) Patent No.: US 8,662,578 B2
(45) Date of Patent: Mar. 4, 2014

(54) AUTO-RESETTING HEAD RESTRAINT CABLE RELEASE WITH LOCKOUT

(75) Inventors: Robert J Szybisty, Livonia, MI (US); David M Runde, Beverly Hills, MI (US)

(73) Assignee: Magna Seating Inc., Aurora, Ontario (CA)

( * ) Notice: Subject to any disclaimer, the term of this patent is extended or adjusted under 35 U.S.C. 154(b) by 62 days.

(21) Appl. No.: 13/394,256

(22) PCT Filed: Sep. 9, 2010

(86) PCT No.: PCT/CA2010/001420
§ 371 (c)(1),
(2), (4) Date: Mar. 5, 2012

(87) PCT Pub. No.: WO2011/029196
PCT Pub. Date: Mar. 17, 2011

(65) Prior Publication Data
US 2012/0161479 A1    Jun. 28, 2012

Related U.S. Application Data

(60) Provisional application No. 61/240,738, filed on Sep. 9, 2009.

(51) Int. Cl.
*B60N 2/20* (2006.01)
*B60N 2/48* (2006.01)

(52) U.S. Cl.
USPC ............. 297/61; 297/378.12; 297/378.14; 297/408

(58) Field of Classification Search
USPC ............. 297/61, 378.1, 378.12, 378.14, 408
See application file for complete search history.

(56) References Cited

U.S. PATENT DOCUMENTS

| 3,712,666 | A | * | 1/1973 | Stoll | 297/61 |
| 3,931,995 | A | * | 1/1976 | Arai | 297/378.12 X |
| 4,422,690 | A | * | 12/1983 | Kopich | 297/378.12 X |
| 5,028,091 | A | * | 7/1991 | Zaveri | 297/378.12 X |
| 5,224,759 | A | * | 7/1993 | Matsuura et al. | 297/378.12 X |
| 5,306,073 | A | * | 4/1994 | Rees | 297/378.12 X |
| 5,466,048 | A | * | 11/1995 | Fowler et al. | 297/378.12 |
| 5,482,349 | A | * | 1/1996 | Richter et al. | 297/378.12 X |
| 5,603,550 | A | * | 2/1997 | Holdampf et al. | 297/378.12 X |
| 5,662,377 | A | * | 9/1997 | Holdampf et al. | 297/378.12 X |
| 5,681,079 | A |   | 10/1997 | Robinson | |

(Continued)

FOREIGN PATENT DOCUMENTS

JP    2008074279    4/2008

*Primary Examiner* — Rodney B White
(74) *Attorney, Agent, or Firm* — Miller Canfield

(57) ABSTRACT

A seat assembly includes a seat back operatively coupled to a seat cushion and a head restraint operatively coupled to the seat back. A bell-crank is pivotally coupled to the seat back and operatively coupled to the seat cushion and a head restraint latch mechanism. Initial pivotal movement of the seat back from a seating position toward a folded position pivots the bell-crank from a first position actuating the latch mechanism to disengage with the head restraint. Continued pivotal movement of the seat back to the folded position pivots the bell-crank to a second position operably disconnecting the bell-crank and seat cushion. Pivotal movement of the seat back from the folded position to the seating position pivots the bell-crank from the second position to the first position actuating the latch mechanism to a position for engagement with the head restraint upon return of the head restraint to a use position.

10 Claims, 6 Drawing Sheets

(56) References Cited

U.S. PATENT DOCUMENTS

| | | | |
|---|---|---|---|
| 5,826,942 A | 10/1998 | Sutton et al. | |
| 6,048,030 A * | 4/2000 | Kanda et al. | 297/378.1 X |
| 6,336,679 B1 * | 1/2002 | Smuk | 297/378.12 |
| 6,390,558 B2 | 5/2002 | Fischer et al. | |
| 6,447,066 B1 * | 9/2002 | Chabanne et al. | 297/378.12 X |
| 6,540,295 B1 * | 4/2003 | Saberan et al. | 297/378.1 X |
| 6,769,734 B2 * | 8/2004 | Tacker | 297/61 |
| 6,799,801 B2 * | 10/2004 | Niimi et al. | 297/378.12 |
| 6,860,564 B2 * | 3/2005 | Reed et al. | 297/408 |
| 7,044,555 B2 | 5/2006 | Saberan | |
| 7,086,698 B2 * | 8/2006 | Shiraki | 297/378.12 X |
| 7,258,400 B2 * | 8/2007 | Yamada | 297/378.12 |
| 7,325,877 B2 * | 2/2008 | Brockman et al. | 297/408 |
| 7,344,189 B2 | 3/2008 | Reed et al. | |
| 7,631,930 B2 * | 12/2009 | Muller et al. | 297/61 |
| 7,740,319 B2 * | 6/2010 | Furukawa et al. | 297/408 |
| 7,878,592 B2 * | 2/2011 | Yamada et al. | 297/378.12 X |
| 7,883,144 B2 * | 2/2011 | Brunner | 297/61 |
| 8,182,037 B2 * | 5/2012 | Jeong et al. | 297/61 X |
| 8,197,001 B2 * | 6/2012 | Grable et al. | 297/61 |
| 2003/0227197 A1 * | 12/2003 | Tacker | 297/61 |
| 2009/0102266 A1 | 4/2009 | Furukawa et al. | |
| 2009/0134683 A1 | 5/2009 | Furukawa et al. | |
| 2011/0221239 A1 * | 9/2011 | Holdampf et al. | 297/61 |

* cited by examiner

AUTO-RESETTING HEAD RESTRAINT CABLE RELEASE WITH LOCKOUT

BACKGROUND OF THE INVENTION

1. Field of the Invention

The present invention relates to a head restraint release cable for automotive seating. More specifically, the present invention relates to a head restraint release cable that is actuated in response to pivoting a seat back forwardly and once the release cable is actuated continued pivoting of the seat back does not continue to actuate the cable.

2. Description of Related Art

Many automotive seats include a head restraint that is operatively coupled to an upper end of a seat back. It is common that such head restraints are movable between an upright use position when the seat back is in a seating position and a tilted stowed position when the seat back is in a forwardly folded position. In some instances the head restraint is moved manually from the use position to the stowed position. In other instances, a release mechanism having a cable is provided to automatically move the head restraint from the use position to the stowed position.

These cable-type release mechanisms are typically operatively coupled between a latch mechanism that locks the head restraint in the use position and a seat cushion such that when the latch mechanism is unlocked in response to pivoting the seat back from the seating position to the forwardly folded position the head restraint will pivot from the use position to the stowed position. One disadvantage of some cable-type release mechanisms is that once the latch mechanism is unlocked and the seat back continues to pivot to the forwardly folded position, a force continues to be applied to the cable. In order to prevent the cable from breaking and to prevent damage to the latch mechanism a compensation spring system is provided to allow additional stretching of the cable. These spring systems require excess cable length and result in increased costs due to additional parts and assembly labor. Additionally, these spring systems may result in unwanted operational noise due to spring stretching.

Another disadvantage of some cable-type release mechanisms is that once the head restraint pivots from the use position to the stowed position the latch mechanism is re-set. Re-setting the latch mechanism when the seat back is in the forwardly folded position allows the head restraint to be returned to the use position prior to returning the seat back to the seating position.

It is therefore desirable to provide a head restraint release cable having a disconnect such that once a head restraint is released from a use position by pivoting a seat back, continued pivoting of the seat back does not apply a force to the cable. It is further desirable to provide a head restraint release cable having a lockout such that a head restraint cannot be returned to a use position until a seat back is returned to a seating position.

SUMMARY OF THE INVENTION

According to one embodiment of the present invention, a seat assembly includes a seat back operatively coupled to a seat cushion for pivotal movement between a seating position and a forwardly folded position. A head restraint is operatively coupled to the seat back for movement between a use position and a stowed position. The head restraint is biased to the stowed position. A latch mechanism is releasably coupled to the head restraint. A bell-crank is pivotally coupled to the seat back and is operatively coupled to the seat cushion and the latch mechanism. The bell-crank is operable between a first position with the seat back in the seating position and a second position with the seat back in the folded position. Initial pivotal movement of the seat back from the seating position toward the folded position pivots the bell-crank from the first position and actuated the latch mechanism to disengage with the head restraint. Continued pivotal movement of the seat back to the folded position pivots the bell-crank to the second position operably disconnecting the bell-crank and the seat cushion. Pivotal movement of the seat back from the folded position to the seating position pivots the bell-crank from the second position to the first position and actuates the latch mechanism to a position for engagement with the head restraint upon return of the head restraint to the use position.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE EMBODIMENTS

Figure 1:
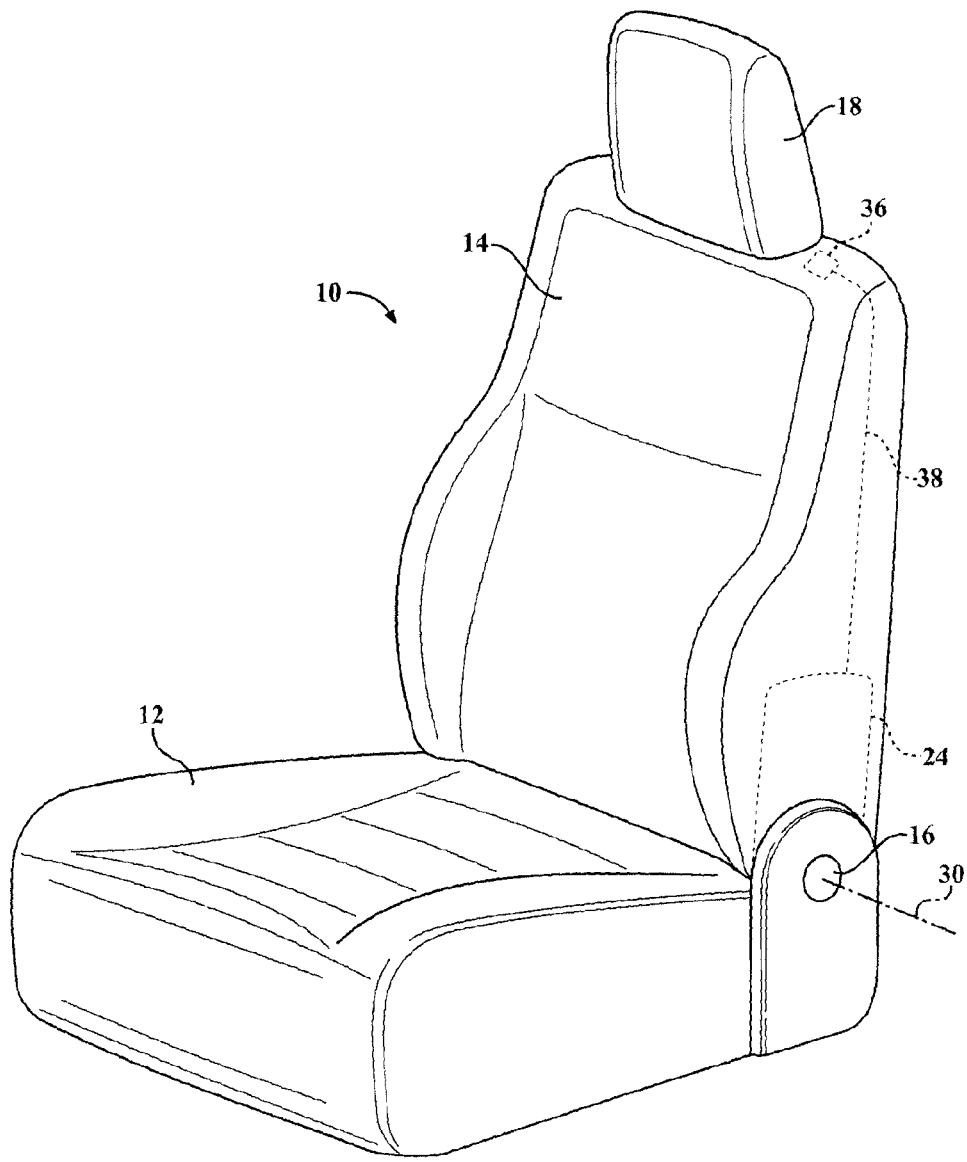
FIG. 1 is a perspective view of a seat assembly with a seat back in an upright seating position and a head restraint in a use position.
Figure 2:
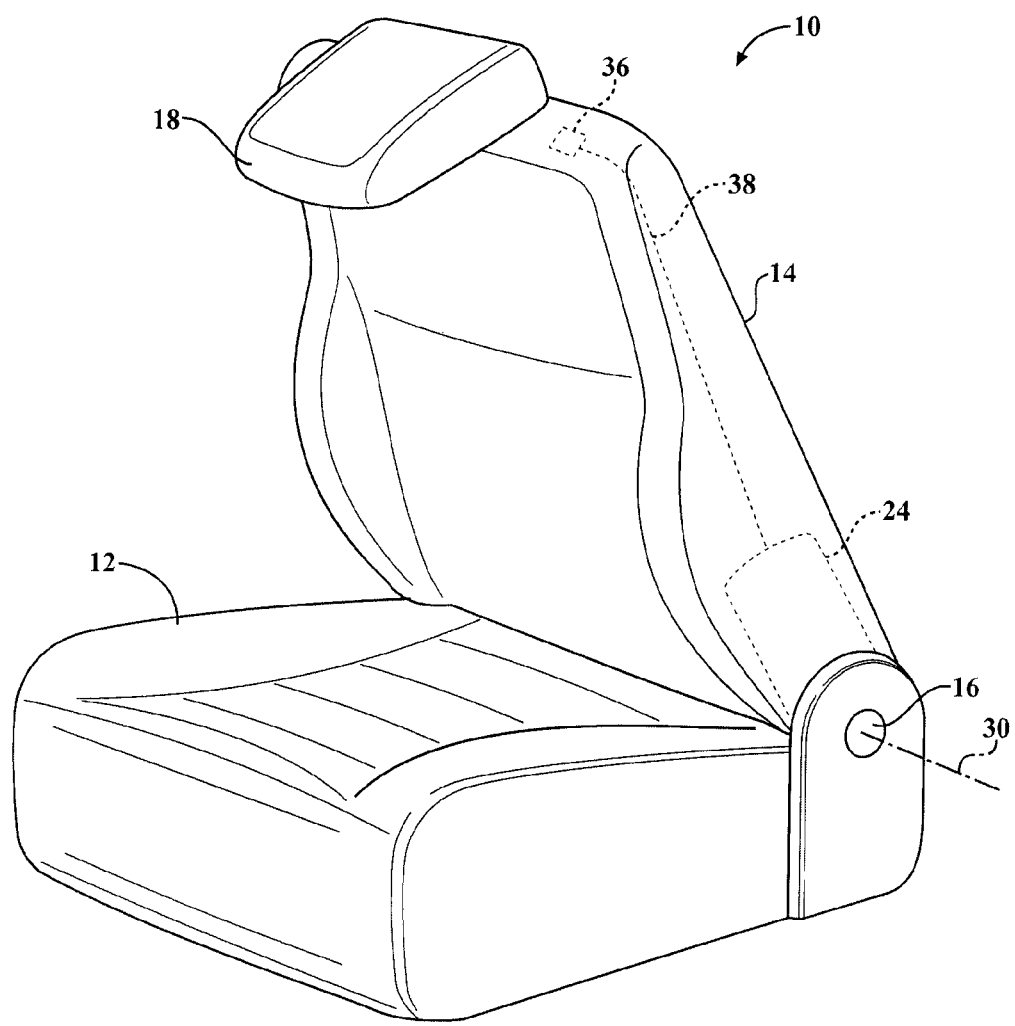
FIG. 2 is a perspective view of the seat assembly with the seat back in a forwardly folded position and the head restraint in a stowed position.

Referring to the Figures, a seat assembly for use in an automotive vehicle is generally shown at 10. The seat assembly 10 includes a seat cushion 12 and a seat back 14 for supporting an occupant thereon. The seat back 14 is operatively coupled to the seat cushion 12 by a pair of synchronized disc recliner mechanisms 16 to allow pivotal adjustment of the seat back 14 between an upright seating position, shown in FIG. 1, and a forwardly folded position, shown in FIG. 2. The seat assembly 10 also includes a head restraint 18 pivotally coupled to an upper end of the seat back 14. The head restraint 18 pivots between an upright use position, shown in FIG. 1, and a forwardly tilted stowed position, shown in FIG. 2. The head restraint 18 is biased toward the stowed position.

Figure 3:
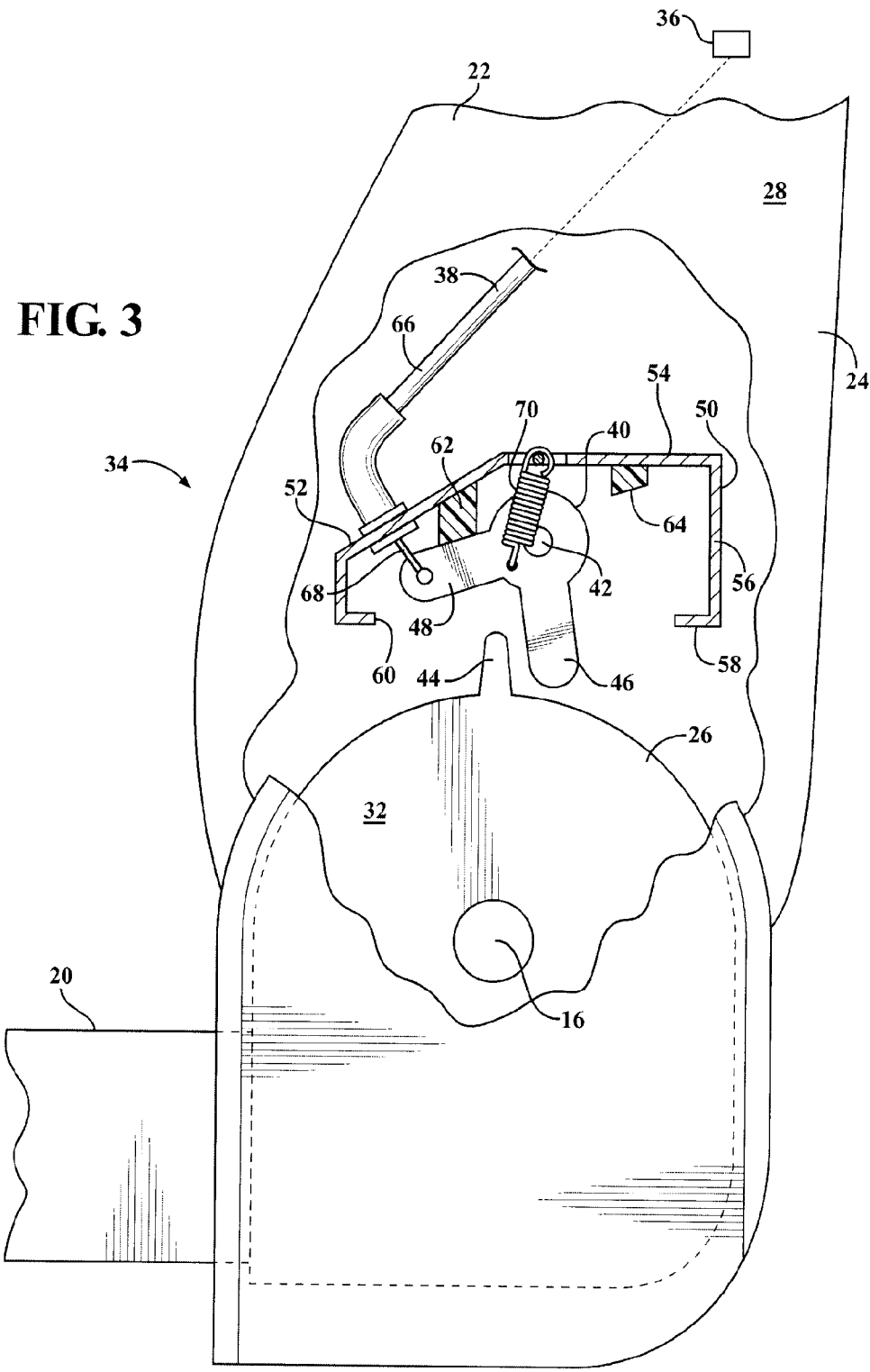
FIG. 3 is a side view of a release mechanism according to a first embodiment of the invention with the seat back in the upright seating position.
Figure 4:
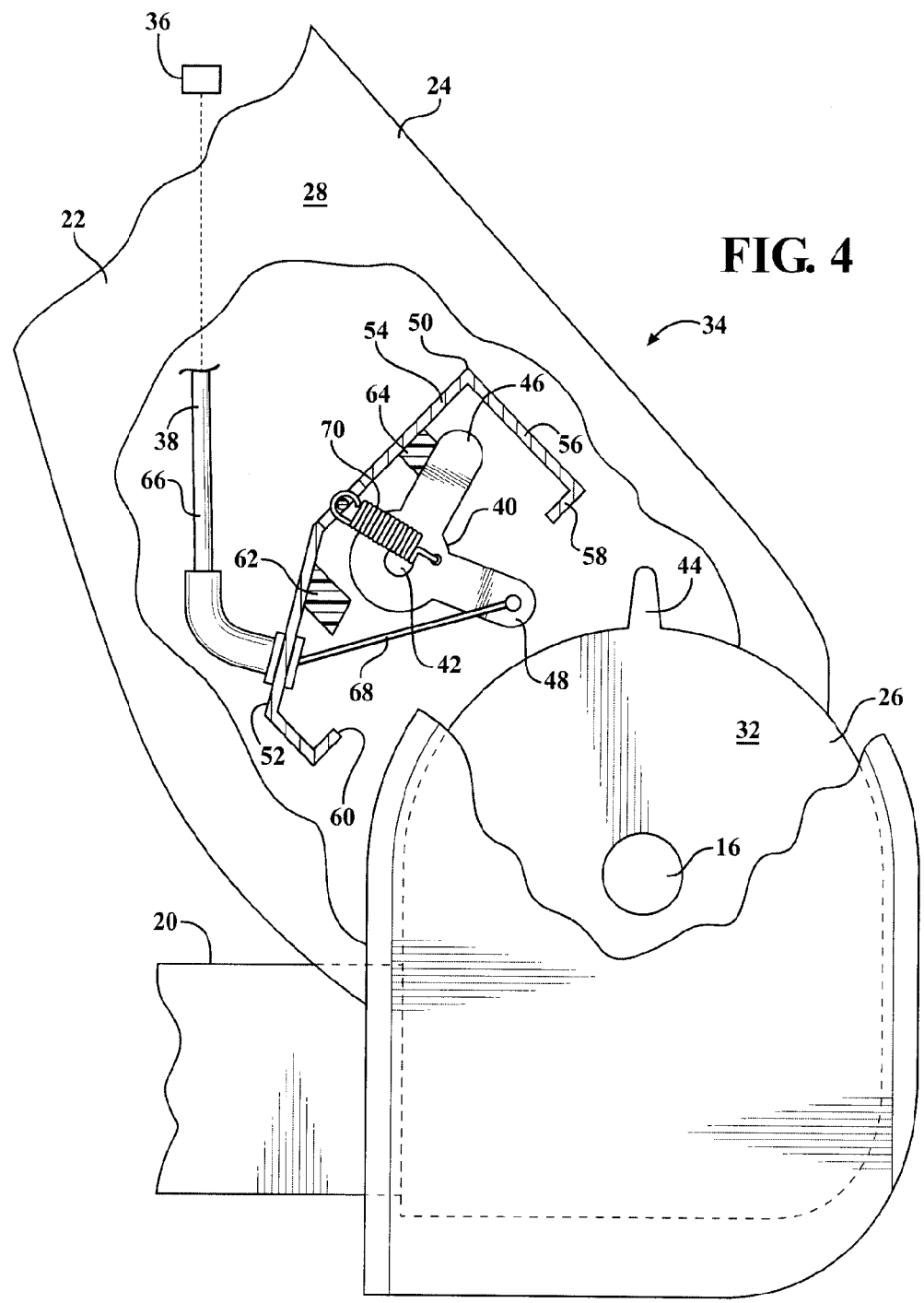
FIG. 4 is a side view of the release mechanism of FIG. 3 with the seat back in the forwardly folded position.

Referring to FIGS. 3 and 4, the construction of the seat cushion 12 includes a rigid seat cushion frame 20 for supporting a contoured foam pad encased by a trim cover as is conventional in the art. Similarly, the construction of the seat back 14 includes a rigid seat back frame 22 for supporting a contoured foam pad encased by a trim cover as is conventional in the art. An A-bracket 24 is integrally formed with or fixedly secured to the seat back frame 22 and a B-bracket 26 is integrally formed with or fixedly secured to the seat cushion frame 20. In the embodiment shown, the A-bracket 24 is disposed laterally inward of the B-bracket 26 and the disc recliner mechanism 16 is operatively coupled between an outboard side 28 of the A-bracket 24 and an inboard side (not shown) of the B-bracket 26. The disc recliner mechanism 16 defines a pivot axis 30 and the seat back 14 pivots about the pivot axis 30 relative to the seat cushion 12. It is appreciated that as an alternative the A-bracket 24 may be disposed laterally outward of the B-bracket 26 such that the disc recliner mechanism 16 is operatively coupled between an inboard side (not shown) of the A-bracket 24 and an outboard side 32 of the B-bracket 26, without varying from the scope of the invention.

A release mechanism, generally shown at 34, is operatively coupled to a latch mechanism 36 with a Bowden-type cable 38. The release mechanism 34 unlocks the latch mechanism 36 in response to pivoting the seat back 14 from the upright seating position to the forwardly folded position, which allows the head restraint 18 to pivot from the use position to the stowed position. Referring to the latch mechanism 36, a hook (not shown) is pivotally coupled to the upper end of the seat back 14 and pivots between a locking position and an unlocking position. In the locking position, the hook will engage with the head restraint 18 to maintain the head restraint 18 in the use position. In the unlocking position, the hook will not engage with the head restraint 18 even if the head restraint 18 is pivoted to the use position. The hook is biased to the locking position.

Referring to the release mechanism 34, a bell-crank 40 is rotatably coupled to the outboard side 28 of the A-bracket 24 at a bell-crank pivot 42 and an upper edge of the B-bracket 26 includes a tab or trigger finger 44 protruding therefrom. The bell-crank 40 and the trigger finger 44 are disposed in the same plane and the bell-crank 40 directly engages the trigger finger 44 during pivotal movement of the seat back 14. The bell-crank 40 includes first and second arms 46, 48 that are generally perpendicular such that the first and second arms 46, 48 form approximately a ninety (90) degree angle therebetween. The bell-crank 40 is partially peripherally surrounded by a housing 50 that is integrally formed with or fixedly secured to the outboard side 28 of the A-bracket 24. The housing 50 includes a front wall 52, a top wall 54, a rear wall 56 and a bottom wall 58 that defines an opening 60 through which a portion of the bell-crank 40 protrudes to engage the trigger finger 44. A forward stop 62 is fixedly secured to an inner side of the front wall 52 and a rearward stop 64 is fixedly secured to an inner side of the top wall 54. When the seat back 14 is in the upright seating position, the bell-crank 40 is oriented in a first position with the first arm 46 extending downwardly through the opening 60 in the housing 50 toward the B-bracket 26 and the second arm 48 abutting the forward stop 62. With the bell-crank 40 in the first position, the first arm 46 is disposed generally rearward of the trigger finger 44. When the seat back 14 is in the forwardly folded position, the bell-crank 40 is oriented in a second position with the second arm 48 extending downwardly through the opening 60 in the housing 50 toward the B-bracket 26 and the first arm 46 abutting the rearward stop 64. With the bell-crank 40 in the second position, the second arm 48 is disposed generally forward of the trigger finger 44.

The Bowden-type cable 38 includes a cable sheath 66 and a cable 68 extending through the cable sheath 66. The cable sheath 66 extends between and is coupled to or directly engages an outer side of the front wall 52 of the housing 50 and a bracket (not shown) adjacent the hook of the latch mechanism 36. One end of the cable 68 passes through the bracket and is connected to the hook and another end of the cable 68 passes through an aperture (not shown) in the front wall 52 of the housing 50 and is connected to the second arm 48 of the bell-crank 40. Rotating the bell-crank 40 in a counterclockwise direction from the first position to the second position pulls the cable 68, which pivots the hook from the locking position to the unlocking position. In contrast, rotating the bell-crank 40 in the clockwise direction from the second position to the first position releases the cable 68 allowing the hook to return to the locking position.

An extension spring 70 extends between the housing 50 and the bell-crank 40 to bias the bell-crank 40 in either the clockwise direction or the counterclockwise direction. More specifically, one end of the spring 70 is connected to the top wall 54 of the housing 50 and another end of the spring 70 is connected to the bell-crank 40 generally between the first and second arms 46, 48. When the seat back 14 is in the upright seating position, the bell-crank 40 is in the first position and the spring 70 is oriented relative to the bell-crank pivot 42 such that the spring 70 biases the bell-crank 40 in the clockwise direction and maintains the second arm 48 abutting the forward stop 62. When the seat back 14 is in the forwardly folded position, the bell-crank 40 is in the second position and the spring 70 is oriented relative to the bell-crank pivot 42 such that the spring 70 biases the bell-crank 40 in the counterclockwise direction and maintains the first arm 46 abutting the rearward stop 64.

In operation, beginning with the seat back 14 in the upright seating position, the bell-crank 40 is in the first position and the hook is in the locking position to maintain the head restraint 18 in the use position. The disc recliner mechanism 16 is actuated to allow the seat back 14 to pivot about the pivot axis 30 to the forwardly folded position. As the seat back 14 pivots forwardly, the first arm 46 of the bell-crank 40 engages the trigger finger 44, which causes the bell-crank 40 to rotate in the counterclockwise direction. Rotating the bell-crank 40 in the counterclockwise direction pulls the cable 68, which pivots the hook from the locking position to the unlocking position. With the hook in the unlocking position, the head restraint 18 automatically pivots to the stowed position. As the seat back 14 continues to pivot forwardly, the first arm 46 falls off or disengages with the trigger finger 44 and at the same time the spring 70 goes over-center of the bell-crank pivot 42, which causes the bell-crank 40 to continue to rotate in the counterclockwise direction until the bell-crank 40 is in the second position with the first arm 46 abutting the rearward stop 64. With the bell-crank 40 in the second position, the cable 68 is at a maximum pulled state such that continued pivoting of the seat back 14 toward the forwardly folded position does not continue to pull the cable 68. Additionally, since the spring 70 is over-center the bell-crank 40 will remain in the second position until the spring 70 goes back over-center, and this in turn maintains the hook in the unlocking position. Thus, the bell-crank 40 acts as a lock-out feature because the head restraint 18 cannot be returned to the use position until the hook is returned to the locking position and the hook cannot be returned to the locking position until the bell-crank 40 returns to the first position.

To return the head restraint 18 to the use position, the seat back 14 is pushed rearwardly to pivot the seat back 14 about the pivot axis 30 to the upright seating position. As the seat back 14 pivots rearwardly, the second arm 48 of the bell-crank 40 engages the trigger finger 44, which causes the bell-crank 40 to rotate in the clockwise direction. Rotating the bell-crank 40 in the clockwise direction releases the cable 68. As the seat back 14 continues to pivot rearwardly, the second arm 48 falls off or disengages with the trigger finger 44 and at the same time the spring 70 goes back over-center of the bell-crank pivot 42, which causes the bell-crank 40 to continue to rotate in the clockwise direction until the bell-crank 40 is in the first position with the second arm 48 abutting the forward stop 62. With the bell-crank 40 in the first position, the cable 68 is fully released, which allows the hook to pivot from the unlocking position to the locking position. With the hook in the locking position, the head restraint 18 can be manually returned to the use position.

Figure 5:
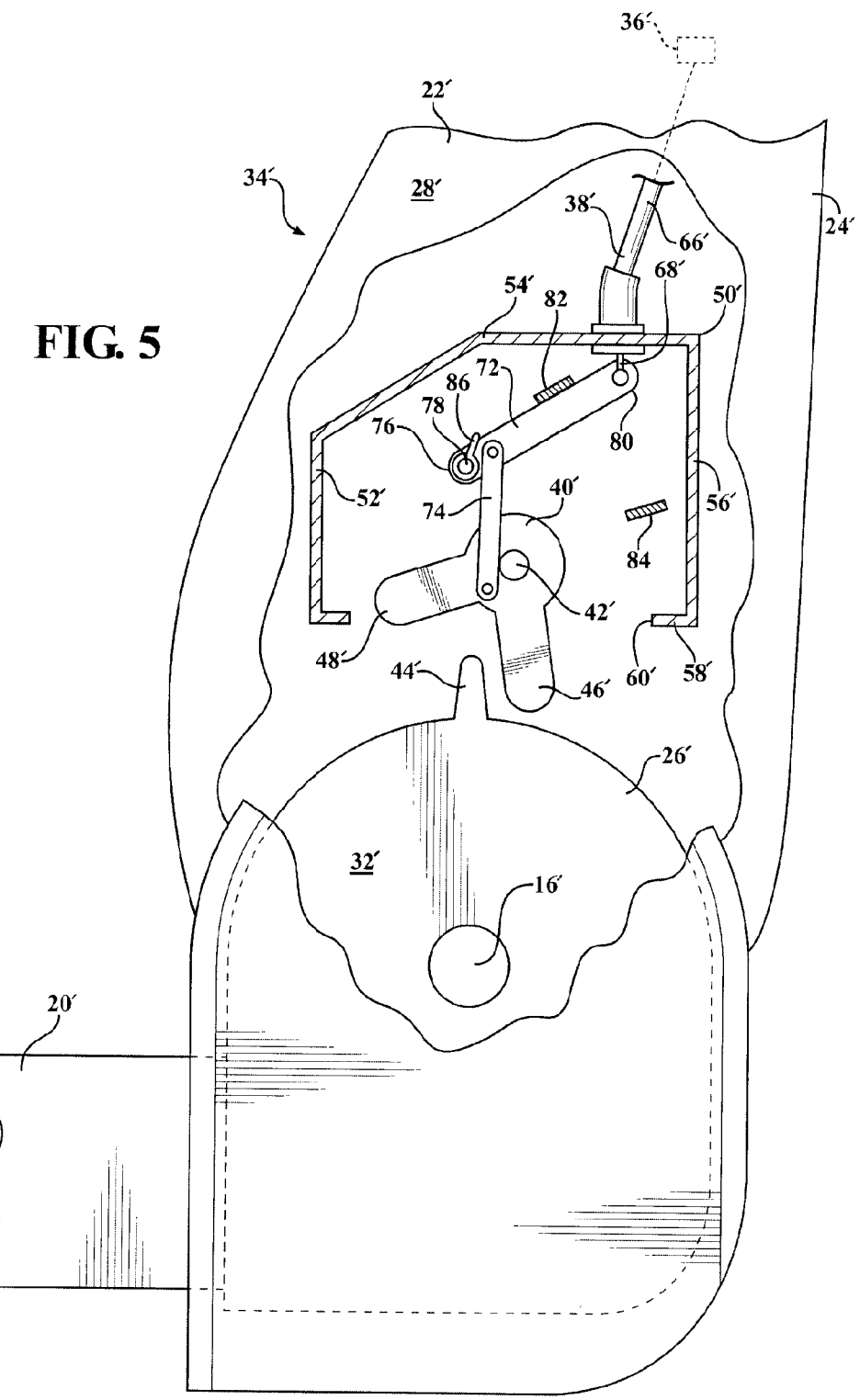
FIG. 5 is a side view of a release mechanism according to a second embodiment of the invention with the seat back in the upright seating position.
Figure 6:
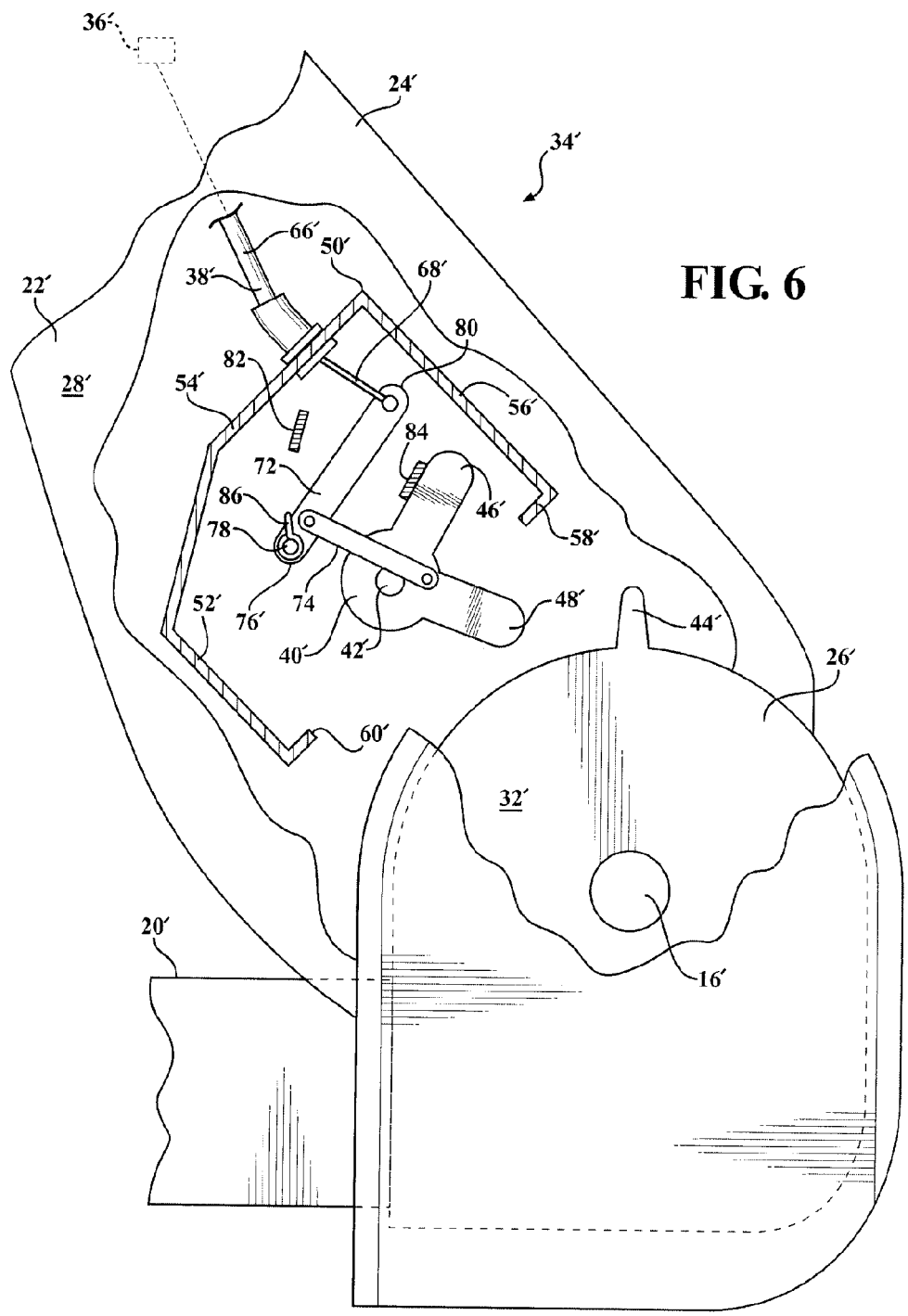
FIG. 6 is a side view of the release mechanism of FIG. 5 with the seat back in the forwardly folded position.

Referring to FIGS. 5 and 6, wherein like primed reference numerals represent similar elements as those disclosed above, in a second embodiment of the invention a release mechanism 34' includes a cable pulling lever 72 and a link 74 operatively coupling a bell-crank 40' and a Bowden-type cable 38'. The cable pulling lever 72 extends between a first proximal end 76 that is pivotally coupled to an outboard side 28' of an A-bracket 24' at a lever pivot 78 and a second distal end 80. One end of the link 74 is pivotally coupled to the cable pulling lever 72 between the lever pivot 78 and the distal end 80 thereof and another end of the link 74 is pivotally coupled to the bell-crank 40' generally between first and second arms 46', 48'. A housing 50' is configured to peripherally surround the cable pulling lever 72 and the link 74 and to partially peripherally surround the bell-crank 40'. Upper and lower stops 82, 84 are disposed within the confines of the housing 50' and are fixedly secured to the outboard side 28' of the A-bracket 24'. The upper stop 82 is disposed adjacent a top wall 54' of the housing 50' and the lower stop 84 is disposed adjacent a bottom wall 58' of the housing 50'. When a seat back 14' is in an upright seating position, the bell-crank 40' is oriented in a first position with the first arm 46' extending downwardly through an opening 60' in the bottom wall 58' of the housing 50' toward a B-bracket 26'. With the bell-crank 40' in the first position, the first arm 46' is disposed generally rearward of a trigger finger 44' protruding from an upper edge of the B-bracket 26'. In addition, with the bell-crank 40' in the first position, the cable pulling lever 72 is oriented with the distal end 80 abutting the upper stop 82. When the seat back 14' is in a forwardly folded position, the bell-crank 40' is oriented in a second position with the second arm 48' extending downwardly through the opening 60' in the bottom wall 58' of the housing 50' toward the B-bracket 26' and the first arm 46' abutting the lower stop 84. With the bell-crank 40' in the second position, the second arm 48' is disposed generally forward of the trigger finger 44'. In addition, with the bell-crank 40' in the second position, the cable pulling lever 72 is oriented with the distal end 80 spaced apart from the upper stop 82.

A cable sheath 66' of the Bowden-type cable 38' extends between and is coupled to or directly engages an outer side of the top wall 54' of the housing 50' and a bracket (not shown) adjacent a hook of a latch mechanism 36'. One end of a cable 68' extending through the sheath 66' passes through the bracket and is connected to the hook and another end of the cable 68' passes through an aperture (not shown) in the top wall 54' and is connected to the distal end 80 of the cable pulling lever 72. Rotating the bell-crank 40' in a counterclockwise direction from the first position to the second position pulls the link 74 downwardly to pivot the cable pulling lever 72 about the lever pivot 78 in a clockwise direction, thereby pulling the cable 68' which pivots the hook from a locking position to an unlocking position. In contrast, rotating the bell-crank 40' in the clockwise direction from the second position to the first position pushes the link 74 upwardly to allow the cable pulling lever 72 to pivot about the lever pivot 78 in the counterclockwise direction, thereby releasing the cable 68' which allows the hook to return to the locking position. It is appreciated that connecting the cable 68' to the cable pulling lever 72 allows for a greater amount of cable pull than rotation of the bell-crank 40 with the cable 68 directly connected thereto, as disclosed in the first embodiment.

A torsion spring 86 is disposed about the lever pivot 78 of the cable pulling lever 72 to bias the cable pulling lever 72 in the counterclockwise direction. In turn, the cable pulling lever 72, through the link 74, biases the bell-crank 40' in either the clockwise direction or the counterclockwise direction. When the seat back 14' is in the upright seating position, the bell-crank 40' is in the first position and the link 74 is oriented relative to a bell-crank pivot 42' such that the torsion spring 86 acting through the cable pulling lever 72 and the link 74 biases the bell-crank 40' in the clockwise direction and maintains the distal end 80 of the cable pulling lever 72 abutting the upper stop 82. When the seat back 14' is in the forwardly folded position, the bell-crank 40' is in the second position and the link 74 is oriented relative to the bell-crank pivot 42' such that the torsion spring 86 acting through the cable pulling lever 72 and the link 74 biases the bell-crank 40' in the counterclockwise direction and maintains the first arm 46' abutting the lower stop 84.

In operation, beginning with the seat back 14' in the upright seating position, the bell-crank 40' is in the first position and the hook is in the locking position to maintain a head restraint 18' in a use position. A disc recliner mechanism 16' is actuated to allow the seat back 14' to pivot about the pivot axis 30' to the forwardly folded position. As the seat back 14' pivots forwardly, the first arm 46' of the bell-crank 40' engages the trigger finger 44', which causes the bell-crank 40' to rotate in the counterclockwise direction. Rotating the bell-crank 40' in the counterclockwise direction pulls the link 74 downwardly, which pivots the cable pulling lever 72 in the clockwise direction, thereby pulling the cable 68' which pivots the hook from the locking position to the unlocking position. With the hook in the unlocking position, the head restraint 18' automatically pivots to the stowed position. As the seat back 14' continues to pivot forwardly, the first arm 46' falls off or disengages with the trigger finger 44' and at the same time the link 74 goes over-center of the bell-crank pivot 42', whereat the torsion spring 86 causes the bell-crank 40' to continue to rotate in the counterclockwise direction until the bell-crank 40' is in the second position with the first arm 46' abutting the lower stop 84. It is appreciated that the cable 68' is at a maximum pulled state as the link 74 goes over-center of the bell-crank pivot 42' such that continued pivoting of the seat back 14' toward the forwardly folded position does not continue to pull the cable 68'. Additionally, since the link 74 is over-center the bell-crank 40' will remain in the second position until the link 74 goes back over-center, and this in turn maintains the hook in the unlocking position. Thus, the bell-crank 40' acts as a lock-out feature because the head restraint 18' cannot be returned to the use position until the hook is returned to the locking position and the hook cannot be returned to the locking position until the bell-crank 40' returns to the first position.

To return the head restraint 18' to the use position, the seat back 14' is pushed rearwardly to pivot the seat back 14' to the upright position. As the seat back 14' pivots rearwardly, the second arm 48' of the bell-crank 40' engages the trigger finger 44', which causes the bell-crank 40' to rotate in the clockwise direction. Rotating the bell-crank 40' in the clockwise direction pushes the link 74 upwardly, which allows the cable pulling lever 72 to pivot in the counterclockwise direction, thereby releasing the cable 68'. As the seat back 14' continues to pivot rearwardly, the second arm 48' falls off or disengages with the trigger finger 44' and at same time the link 74 goes back over-center of the bell-crank pivot 42', whereat the torsion spring 86 causes the bell-crank 40' to continue to rotate in the clockwise direction until the bell-crank 40' is in the first position and the distal end 80 of the cable pulling lever 72 is abutting the upper stop 82. With the bell-crank 40' in the first position, the cable 68' is fully released, which allows the hook to pivot from the unlocking position to the locking position. With the hook in the locking position, the head restraint 18' can be manually returned to the use position.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for an automotive vehicle, said seat assembly comprising:
    a seat cushion;
    a seat back operatively coupled to said seat cushion, said seat back pivotally movable between a seating position and a forwardly folded position;
    a head restraint operatively coupled to said seat back, said head restraint movable between a use position and a stowed position, said head restraint biased to said stowed position;
    a latch mechanism releasably coupled to said head restraint; and
    a release mechanism operatively coupled between said latch mechanism and said seat cushion for actuating said latch mechanism in response to pivotal movement of said seat back from said seating position to said forwardly folded position, said release mechanism including a bell-crank pivotally coupled to said seat back and operatively coupled to said seat cushion and said latch mechanism, said bell-crank operable between a first position with said seat back in said seating position and a second position with said seat back in said forwardly folded position;
    wherein initial pivotal movement of said seat back from said seating position toward said folded position pivots said bell crank from said first position actuating said latch mechanism to disengage with said head restraint, and wherein continued pivotal movement of said seat back to said folded position pivots said bell crank to said second position operably disconnecting said bell-crank and said seat cushion, and wherein pivotal movement of said seat back from said folded position to said seating position pivots said bell crank from said second position to said first position actuating said latch mechanism to a position for engagement with said head restraint upon return of said head restraint to said use position; and
    wherein said bell crank includes a first arm and a second arm, said first position of said bell crank defined with said second arm engaging a first stop fixedly secured to said seat back and said second position of said bell-crank defined with said first arm engaging a second stop fixedly secured to said seat back and spaced from said first stop and said release mechanism further includes a trigger finger fixedly secured to said seat cushion, said first arm engaging said trigger finger to pivot said bell crank from said first position in response to said initial pivotal movement of said seat back from said seating position toward said folded position, and said second arm engaging said trigger finger to pivot said bell crank from said second position in response to said pivotal movement of said seat back from said folded position toward said seating position.

2. A seat assembly as set forth in claim 1 wherein said release mechanism further includes a spring extending between one end connected to said seat back and another end connected to said bell crank, said spring biasing said bell crank to said first position with said seat back in said seating position and said spring biasing said bell crank to said second position with said seat back in said folded position.

3. A seat assembly as set forth in claim 2 wherein said bell crank is pivotally connected to said seat back by a bell crank pivot and said first and second arms are spaced apart about said bell crank pivot.

4. A seat assembly as set forth in claim 3 further including a push-pull cable assembly interconnected between said latch mechanism and said second arm of said bell crank for actuating said latch mechanism in response to pivotal movement of said bell crank.

5. A seat assembly as set forth in claim 1 wherein said bell crank is pivotally connected to said seat back by a bell crank pivot and includes first and second arms spaced apart about said bell crank pivot.

6. A seat assembly as set forth in claim 5 wherein said release mechanism includes a cable pulley lever extending between a first proximal end pivotally connected to said seat back by a lever pivot and an opposite distal end positioned for selective engagement with an upper stop fixed to said seat back and defining said first position.

7. A seat assembly as set forth in claim 6 wherein said release mechanism includes a link extending between a first end pivotally connected to said cable pulley lever between said first and second ends and a second end pivotally connected to said bell crank between said first and second arms for pivoting said bell crank between said first and second positions in response to pivotal movement of said cable pulley lever.

8. A seat assembly as set forth in claim 7 wherein said release mechanism further includes a trigger finger fixedly secured to said seat cushion, said first arm engaging said trigger finger to pivot said bell-crank from said first position in response to said initial pivotal movement of said seat back from said seating position toward said folded position, and said second arm engaging said trigger finger to pivot said bell-crank from said second position in response to said pivotal movement of said seat back from said folded position toward said seating position.

9. A seat assembly as set forth in claim 8 wherein said release mechanism includes a torsion spring operatively coupled between said seat back and said cable pulley lever for biasing said bell crank to said first position with said seat back in said seating position and biasing said bell crank to said second position with said seat back in said folded position.

10. A seat assembly as set forth in claim 9 further including a push-pull cable assembly interconnected between said latch mechanism and said second distal end of said cable pulley lever for actuating said latch mechanism in response to pivotal movement of said bell crank.

* * * * *